United States Patent [19]
Cloeren

[11] Patent Number: 5,516,474
[45] Date of Patent: May 14, 1996

[54] THERMALLY DISTINCT LAYER COEXTRUSION

[75] Inventor: Peter F. Cloeren, Orange, Tex.

[73] Assignee: The Cloeren Company, Orange, Tex.

[21] Appl. No.: 157,731

[22] Filed: Nov. 24, 1993

[51] Int. Cl.⁶ .......................... B29C 47/06; B29C 47/92
[52] U.S. Cl. .................. 264/171.230; 264/40.6;
264/173.14; 264/173.16; 264/173.19; 425/131.1;
425/133.5; 425/144; 425/462
[58] Field of Search .................... 264/171, 173,
264/514, 515, 171.23, 173.16, 173.19, 173.14,
40.6; 425/133.5, 131.1, 462, 144; 156/244.11

[56] References Cited

U.S. PATENT DOCUMENTS

| | | |
|---|---|---|
| Re. 33,376 | 10/1990 | Gibbons et al. . |
| 3,097,058 | 11/1963 | Branscum et al. . |
| 3,797,987 | 3/1974 | Marion . |
| 3,829,274 | 8/1974 | Melead . |
| 3,865,665 | 2/1975 | Marion . |
| 3,933,964 | 1/1976 | Brooks .................. 264/171 |
| 3,993,810 | 11/1976 | Bonis .................... 264/171 |
| 4,107,247 | 8/1978 | Dukess ................... 264/171 |
| 4,206,165 | 6/1980 | Dukess ................... 264/171 |
| 4,332,543 | 6/1982 | Fulton et al. . |
| 4,370,187 | 1/1983 | Katagiri et al. . |
| 4,619,802 | 10/1986 | Cloeren . |
| 4,652,325 | 3/1987 | Benge et al. . |
| 4,701,360 | 10/1987 | Gibbons et al. . |
| 4,708,618 | 11/1987 | Reifenhäuser et al. ........ 425/462 |
| 4,784,815 | 11/1988 | Cloeren . |
| 4,798,526 | 1/1989 | Briggs et al. ............... 425/462 |
| 4,994,638 | 2/1991 | Iorns et al. ................ 426/113 |
| 5,106,562 | 4/1992 | Blemberg et al. . |
| 5,120,484 | 6/1992 | Cloeren ................... 264/171 |
| 5,137,675 | 8/1992 | Rabe ...................... 425/462 |
| 5,156,715 | 10/1992 | Starnes, Jr. ................ 264/262 |
| 5,342,662 | 8/1994 | Aoyama et al. ............. 428/34.8 |

FOREIGN PATENT DOCUMENTS

| | | |
|---|---|---|
| 2345049 | 3/1975 | Germany . |
| 56-56843 | 5/1981 | Japan .................... 425/131.1 |
| 2186522 | 8/1987 | United Kingdom . |

*Primary Examiner*—Jeffery R. Thurlow
*Attorney, Agent, or Firm*—Timothy R. Kroboth

[57] ABSTRACT

The present invention provides a novel process for preparing composites including layers having thermally distinct processing requirements. Beneficially, the process may use a single manifold die. By the process, useful containers may be manufactured.

17 Claims, 6 Drawing Sheets

THERMALLY DISTINCT LAYER COEXTRUSION

BACKGROUND OF THE INVENTION

This invention relates to coextrusion, particularly of a composite having thermally distinct layers.

Composites including layers having thermally distinct processing requirements, are of considerable commercial importance. In the case of some materials, thermal sensitivity is a problem during processing. For example, material degradation and equipment fouling may result. In other cases, it is beneficial to take advantage of thermal sensitivity, by for instance providing useful surface effects. For example, a surface oxidation-promoting, melt temperature benefits surface adhesion of materials such as polyethylene (PE). In even other cases, high temperatures are necessary for processability due to for instance, high melt viscosity.

One such composite is a liquid packaging container including a paperboard/low density polyethylene/low density polyethylene structure. The challenge is to provide a paperboard-contacting, PE layer with a preferred surface oxidation-promoting, melt temperature of about 315° C. or more for good surface bonding to the paperboard, and to provide a liquid-contacting, PE layer with a preferred lower melt temperature of approximately 275° C. to 285° C. The higher melt temperature promotes bonding by promoting oxidation of the PE surface and enhancement of surface wetting. The lower melt temperature reduces surface oxidation, and provides improved heat seal performance and improved organoleptic properties including decreased residual odor.

Another such composite includes an oriented polypropylene substrate/low density polyethylene/ethylene vinyl acetate structure. The PE layer benefits from a melt processing temperature of about 300° C. or more for promotion of substrate adhesion, whereas the ethylene vinyl acetate (EVA) layer preferably has a melt processing temperature of about 230° C. or less to minimize residual odor. Also, EVA is thermally sensitive at elevated temperatures, with decomposition being further accelerated by metal contact.

Also including layers having thermally distinct processing requirements, is protective document laminating film including an oriented polyester substrate/polyethylene/ethylene vinyl acetate structure. EVA is a desirable thermoplastic for document contact because of its low heat sealing temperature. However, as may be understood from the previous example, PE and EVA typically have thermally distinct processing requirements.

As can be understood by one skilled in the art, composites including layers having thermally distinct processing requirements, have application not only to extrusion coating but also to extrusion lamination and to cast film and sheet products. These composites include polyamide and ethylene vinyl alcohol (EVOH) layered structures. EVOH is a thermally sensitive polymer with a tendency to crosslink, accelerated by elevated temperature and metal contact, as a result of which degradation and contamination typically result. Thus, a preferred melt processing temperature for EVOH is about 220° to 230° C. By comparison, polyamide-6 has a preferred melt processing temperature of about 270° C., and becomes effectively non-processable at temperatures of about 250° C. due to its extremely high flow viscosity.

A common solution for coating a substrate with layers having thermally distinct processing requirements, uses extrusion stations that operate at different processing temperatures. One such approach is exemplified in FIG. 8 of U.S. Pat. No. 4,701,360 to Gibbons et al, which describes coating a paperboard substrate with PE and thereafter coating the exposed PE surface with EVOH. This approach is generally illustrated in FIG. 1, which shows a substrate 1 being passed through a first extrusion coating station 2, at which a high melt temperature extrudate 3 is applied, quenched and solidified, and then being passed through a second coating station 4, at which a low melt temperature extrudate 5 is applied, quenched and solidified onto the extrudate/substrate composite. Similar is the process illustrated in FIGS. 9 and 10 of U.S. Pat. No. Re. 33,376 to Gibbons et al. An economic disadvantage is that this solution uses more than one extrusion station.

Another solution is to extrude the melt streams as exemplified by U.S. Pat. No. 3,797,987 to Marion. In this approach, streams of substantially different temperature are fed into a dual outlet, extrusion apparatus. The apparatus includes two separate flow channels each with a transverse flow-providing manifold and outlet; a common thermal barrier between and in fluid contact with the flow streams; and thermally independent, body halves separated by the thermal barrier. Disadvantages include the potential for entrapment of volatiles within the extruded composite, with negative affect upon organoleptics; metal surface contact of each stream face during the entire residence within the extrusion apparatus; and the potential for air entrapment between the melt streams as they are melt laminated together at the coating nip. Furthermore, as in the case of the FIG. 1 solution, extruded composite thickness, cross machine thickness variation and nominal individual layer thickness may be greater and hence manufacturing costs may be more than if the layers were coextruded. For purposes of this invention, the term "coextruded" is meant to require flow stream convergence to form a composite followed by transverse spreading of the composite.

A prior approach of the inventor has been to combine streams of substantially different temperatures in a conventional feedblock and to thereafter effect transverse spreading of the composite stream in a die body having thermally independent, body halves. However, this approach has not been entirely satisfactory. For example, the feedblock is set to a temperature between the temperatures of the streams, which significantly compromises thermal differentiation. Moreover, it would be difficult to produce a composite characterized by a small, yet distinct, temperature differential between layers or layer surfaces, from streams with a small temperature differential.

Therefore, there is a need for an improved extrusion process for providing composites including layers or layer surfaces having thermally distinct, processing needs. As can be understood from the foregoing discussion, by the term "thermally distinct" is generally meant a temperature difference of at least about 20° C., more typically at least about 25° to 30° C. However, it will be appreciated by one skilled in the art that in the case of certain materials and processing, a processing difference of about 10° C. will be thermally distinct.

SUMMARY OF THE INVENTION

It is accordingly an object of the present invention to provide an improved process for extruding composites including layers or layer surfaces having thermally distinct, processing requirements.

It is a further object to provide an improved process that would use only a single extrusion station.

It is a still further object to reduce entrapment of volatiles, reduce metal surface contact, and avoid air entrapment between melt streams.

It is an even further object to minimize extruded composite thickness, cross machine thickness variation and nominal individual layer thickness, and thus manufacturing costs.

Additional objects, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

As will become better understood from the description that follows, an advantage compared to prior art feedblock convergence, previously mentioned, is that the process of the present invention will produce a composite having a greater temperature differential between layers or layer surfaces, from streams having a given temperature differential. Moreover, it may produce a composite characterized by a small, yet distinct, temperature differential between layers or layer surfaces, from streams with a small temperature differential. Furthermore, the process is adaptable to a conventional single manifold die.

To achieve the foregoing objects and in accordance with the purpose of the present invention, as embodied and broadly described herein, there is provided an improved process for producing a composite having thermally distinct faces. By the process, a first stream and a second stream are introduced into an extrusion apparatus including thermally independent flow channels, the first stream and the second stream being at substantially different temperatures. As a result, prior to convergence, each stream may be substantially isolated from thermal change. For purposes of the description of the present invention, by the term "substantially different temperatures" is generally meant a temperature difference of at least about 10° C., more typically at least about 25° to 30° C. or more.

By the inventive process, the first stream and second stream are converged to form a layered composite, and are then transversely spread. Beneficially, during the transverse spreading, a first face of the composite and a second face of the composite may be exposed to thermally distinct, flow channel wall temperatures. As a result, each such face may be shielded from thermal change. Thereafter, the transversely spread, composite is passed from the extrusion apparatus.

As a result, the thermally distinct character of the streams introduced into the apparatus may be carried over to layers or faces of the composite. For completeness of this brief description of the present invention, reference is made to the earlier definition of thermally distinct.

Advantageously, the locus of stream convergence is selected to reduce contact between the streams, and loss of thermal differentiation of the streams. To this end, the stream convergence may beneficially be as close as possible to a locus at which the transverse spreading begins. As a result, stream interface contact may be minimized.

In certain applications, the extrusion apparatus may include a feedblock and die body, and thermally independent flow channels may be disposed in the feedblock, and may also beneficially be provided in the die body. In other applications, the extrusion apparatus may include only a die body.

If desired, the process may include coating a substrate with a coextruded composite. In such case, the process may beneficially provide a substrate-contacting layer of the composite with thermally-effected, surface character for adhesion to the substrate, while providing a second layer with distinctly different surface character such as enhanced heat seal performance.

Also beneficially provided is a container made using the composite of the foregoing process, and is a process for making such a container.

In the detailed description of the invention that follows, there are essentially described only exemplary embodiments of this invention and of the apparatus useful therewith, simply by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention.

DETAILED DESCRIPTION OF THE INVENTION

The present invention is directed to a novel extrusion process that is able to provide composites including layers or layer surfaces having thermally distinct, processing requirements. By the process, loss of thermal differentiation resulting from thermal energy migration, may be minimized. Moreover, heat penetration theory, thermal diffusivity, and contact time are taken into account, and in this respect, reference is made to U.S. Pat. No. 4,332,543 to Fulton et al, and in particular to the discussion at column 6 thereof, which is hereby incorporated herein by reference, to the extent applicable.

Beneficially, the process may be used for making composites useful for forming containers or otherwise useful for packaging, such as for packaging food stuffs. In this respect, the process may be used to reduce organoleptic contamination and to enhance surface character. As is clear to one skilled in the art, composites made by this process, are useful for a variety of applications.

As can be understood, this invention is generally intended for use with synthetic resins or liquid crystalline polymers. Exemplary materials include polyalkylenes such as polyethylene and polypropylene, polyesters such as PET and PBT, polystyrenes, polyacrylonitriles, polyamides, EVOH and other polymers, and include copolymers thereof. A particularly useful composite may include a barrier layer, which may be inter alia, a polyamide, a copolymer of a polyamide, a polyester, a copolymer of a polyester, or EVOH.

Figure 1:
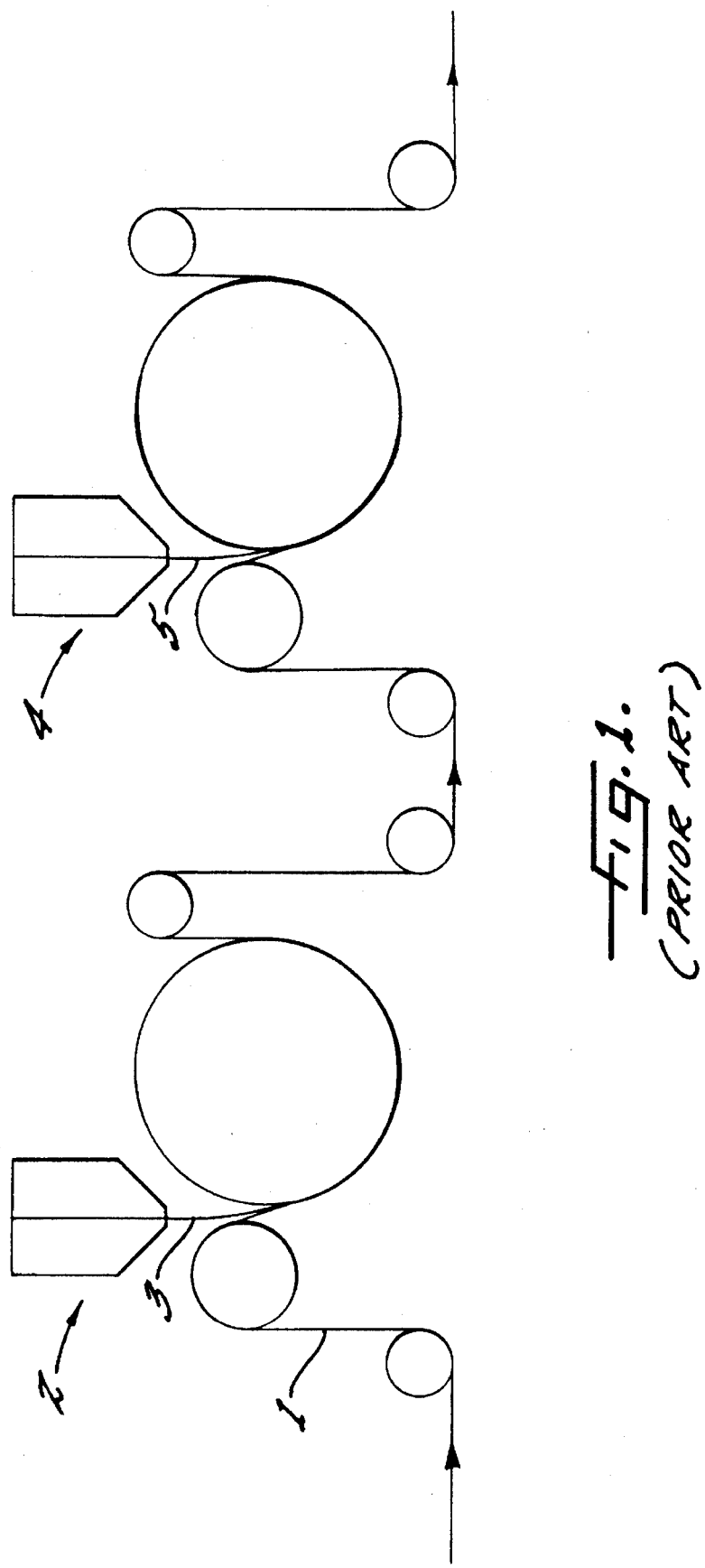
FIG. 1 is an illustrative prior art process.
Figure 2:
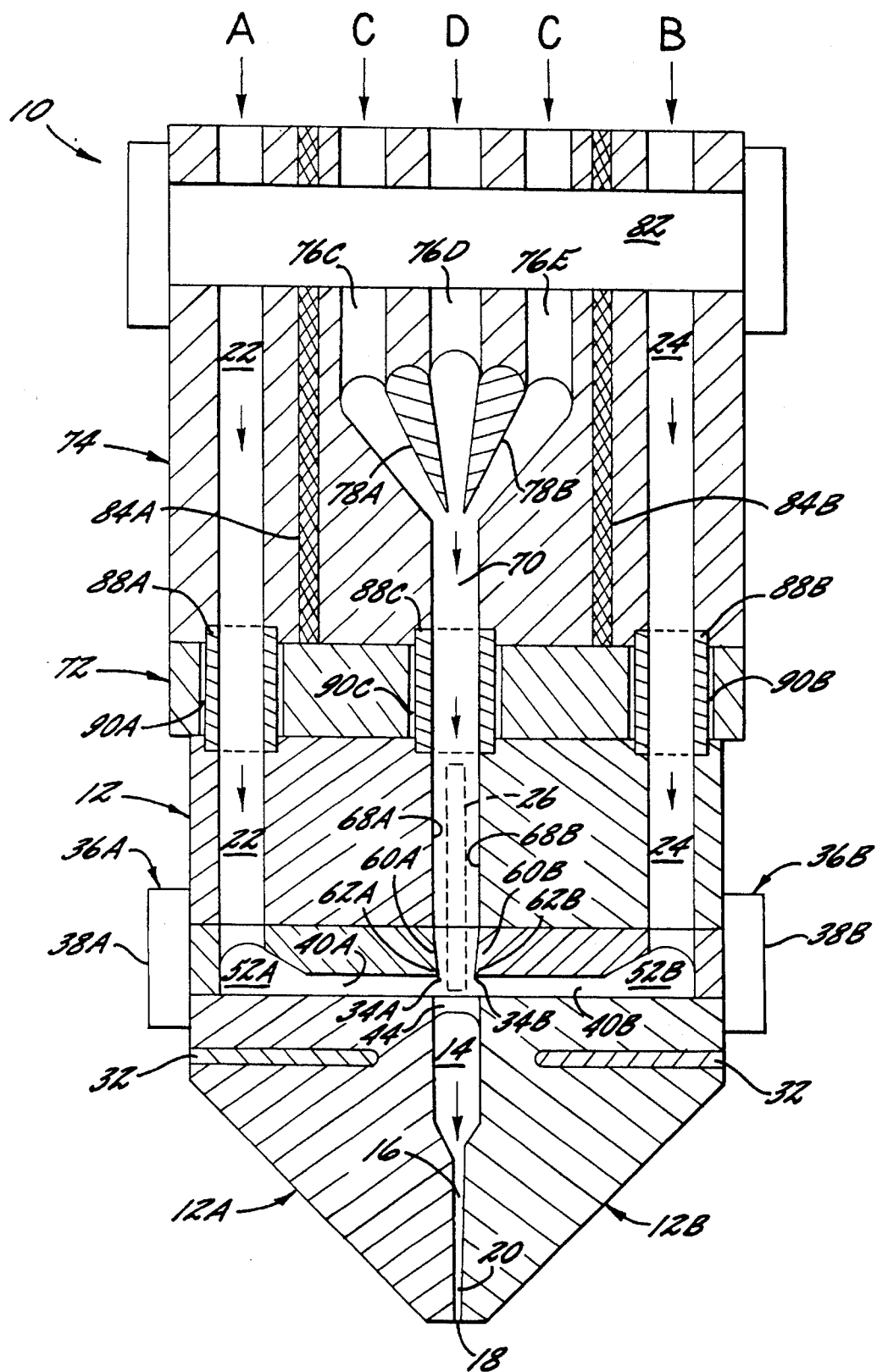
FIG. 2 is a cross-sectional view of an exemplary embodiment of an extrusion apparatus useful in carrying out the process of the present invention.

Referring to FIG. 2, an exemplary embodiment of an extrusion apparatus 10 useful in the unique process of the present invention, is shown. The apparatus includes a die body 12 having a manifold 14, and downstream thereof a preland channel 16 in fluid communication with an exit orifice or slot 18 by a land channel 20. The diminished cross-sectional height of the preland channel and land channel vis-a-vis the manifold, restricts the main direction of flow, indicated by arrows, thus providing for transverse flow within the manifold.

As shown, the manifold may have a non-circular shape. A generally rectangular shape will typically be preferable. Also as indicated, the preland channel beneficially may have a widthwise, pressure-compensating channel portion, which may be of the conventional type. The land channel typically has parallel walls defining the channel gap.

Upstream of the manifold and in fluid communication therewith are side flow channels 22,24, advantageously disposed in thermally independent, die body halves 12A, 12B, between which a thermal barrier 26 is beneficially located at an interface (not shown), and more particularly in a surface recess of each die body half. As may be understood, each die body half is advantageously provided with temperature affecting means (not shown) and thermal detection means 32 for control of the temperature affecting means so as to provide each die portion with its desired temperature. Depending upon the particular application, die body halves 12A,12B or portions thereof may be provided with essentially the same operating temperature or with thermally distinct temperatures.

Beneficially, the thermal barrier may be a conventional thermal insulation board. However, any thermal barrier means for instance, a heat pipe or a sufficient air gap, may be used that maintains thermally independent flow channels. Moreover, thermally independent or distinct, die portions or flow channels or flow channel walls may be provided by the use of heat pipes strategically located, some of which in an appropriate case, may have an end extending exterior to a die body for desired thermal effect, and in this respect, attention is invited to European Patent Application 625419, which was published on Nov. 23, 1994, and which corresponds to abandoned U.S. patent application Ser. No. 064, 754, filed on May 19, 1993. Thus, heat pipes or other temperature affecting means may provide or regulate a desired temperature differential.

Beneficially, thermal detection element 32 may be located close to manifold 14 to provide for temperature sensitivity and control near the flow channel wall. As a result, the streams during convergence may be exposed to flow channel walls at substantially different temperatures, as likewise may be the wall-contacting faces of the resulting composite during transverse spreading. Differential temperature exposure during transverse spreading is especially important because a significant proportion, in many cases a major proportion, of residence time within an extrusion apparatus such as apparatus 10, is within the manifold.

Connected to die body 12 by means of a mounting plate 72 is a conventional feedblock 74 modified to provide thermal isolation of the two outside flow channels relative to each other and also to central flow channels. A central flow channel 70 is formed by the convergence of central flow channels 76C,76D,76E, advantageously separated by conventional flow dividers 78A,78B prior to convergence. The dividers may be adjustable or fixed depending upon the particular application. Each of channels 76 includes a manifold in which the streams are conveniently spread widthwise prior to convergence. Advantageously, a conventional selector plug 82 controls flow selection to feedblock channels 76.

Beneficially disposed between side flow channel 22 and central flow channels 70,76 as well as side flow channel 24, is a thermal barrier 84A, which may be constituted in like manner as thermal barrier 26. It will be understood that any thermal barrier means may be used that maintains thermally independent, feedblock body portions and respective flow channels. Similarly, beneficially disposed between side flow channel 24 and central flow channels 70,76 as well as side flow channel 22, is a thermal barrier 84B. If desired, these thermal barriers, as shown, may run the length of the feedblock and may be continuous. Non-continuous thermal barriers could of course be provided, and thermal barriers 84A,84B could be the identically or differently constituted.

Situated between die body 12 and feedblock 74 is mounting plate 72, which includes passages within each of which is a conventional sealing member 88A,88C,88B. These sealing members provide for communication of the feedblock flow channels with the die body flow channels, and advantageously are each separated from the mounting plate by a thermal barrier 90A,90C,90B. In combination with thermal barriers 26,84A,84B, thermal barriers 90A,90C,90B advantageously isolate side channels 22,24 from each other and from the central flow channels.

Advantageously, combining means 36A having a flange 38A, includes a channel 40A that forms side channel 22 in part, and includes a wall 60A that intrudes into central channel 70. Intruding wall 60A provides a desired flow geometry to channel 70 prior to convergence with channel 22, and channel 40A is suitably oriented for generally perpendicular convergence with the central channel. Common to flow channels 22,70 is a point 62A of wall 60A of combining insert 36A. Downstream of the point, channels 22,70 converge at a locus of convergence 34A.

The combining insert is suitably fixed in place by use of bolts (not shown). By removal of the bolts and grasping the insert flange, the insert can be withdrawn from the die body. As can be appreciated, insert removability permits variation in convergence flow geometry in accordance with flow stream processing requirements, and variation in flow delivery. Accordingly, a flow stream could be directly introduced through the insert, and in this respect, reference is made to U.S. Pat. No. 3,097,058 to Branscum et al. However, as likewise may be appreciated, an insert is merely convenient, not necessary.

Conveniently, combining means 36B is identical to insert 36A, and thus includes an intruding wall 60B. Common to flow channels 24,70 is a point 62B of wall 60B of combining insert 36B. Downstream of the point, channels 24,70 converge at a locus of convergence 34B. Convergence of channels 22,70,24 forms a combined flow channel 44. The walls of combined channel 44 may, as shown, be a linear continuation of a respective wall 68A,68B of channel 70 upstream of the intruding walls. The combined channel feeds the composite stream provided by channel convergence, to manifold 14.

Conveniently, each combining means includes a manifold 52 for forming the respective channel width as desired. Upstream of these manifolds, channels 22,24 may suitably be of circular or non-circular cross-section. A circular cross-section provides less channel surface area for heat transfer than a non-circular cross-section.

Loci of convergence 34A,34B are beneficially within die body 12, rather than for example, within the feedblock. In this manner, contact time between flow streams is reduced, as is loss of thermal differentiation of streams A,B. Generally speaking, stream convergence is preferably effected as close as possible to a locus (not shown) within the manifold at which the composite stream diverges to undergo transverse flow. In this way, interface contact time and resultant loss of thermal differentiation of the flow streams may be minimized. In regard thereto, apparatus 10 is similar to the apparatus of U.S. Pat. No. 4,619,802 to Cloeren, the relevant description of which is hereby incorporated herein by reference. However, as explained, new and unforeseen benefits result for the process of the present invention.

Operation of apparatus 10 will now be described. In operation, flow streams A,B are introduced into side channels 22,24 at temperatures of 330° C. and 285° C., respectively, and flow streams C,D,C are introduced into central channels 76C,76D,76E, respectively. The central streams may be for instance, at a third temperature, or may be at the temperature of either side stream. The central channel streams are converged to form a three layer composite; however, convergence of the outer streams is avoided. Thermal barriers 84A,84B isolate the outer streams from one another, and either outer stream from the streams within the centrally located, flow channels. Thereafter, streams A,CDC,B are passed from the feedblock into die body 12.

Within the die body and proximate to the locus of stream divergence within manifold 14, streams A,CDC,B are beneficially converged. A flow stream-contacting temperature at or below 285° C. is maintained in die body half 12B, and a flow stream-contacting temperature at or above 325° C. is maintained in die body half 12A. After convergence and subsequent transverse flow within the manifold, a five layer composite having thermally distinct, outer layers, issues from apparatus 10 for if appropriate, bonding of the higher melt temperature face with a suitable substrate.

Thermal independence of die body halves 12A,12B is benefited downstream of convergence, by low heat conductivity of the composite or layer(s) thereof. Advantageously, this process benefits from heat penetration theory, by minimizing migration of thermal energy between layers which may come into or be in fluid communication with one another. As can thus be understood, the process of the present invention is able to coextrude a composite including outer layers with distinctly different character.

Figure 3:
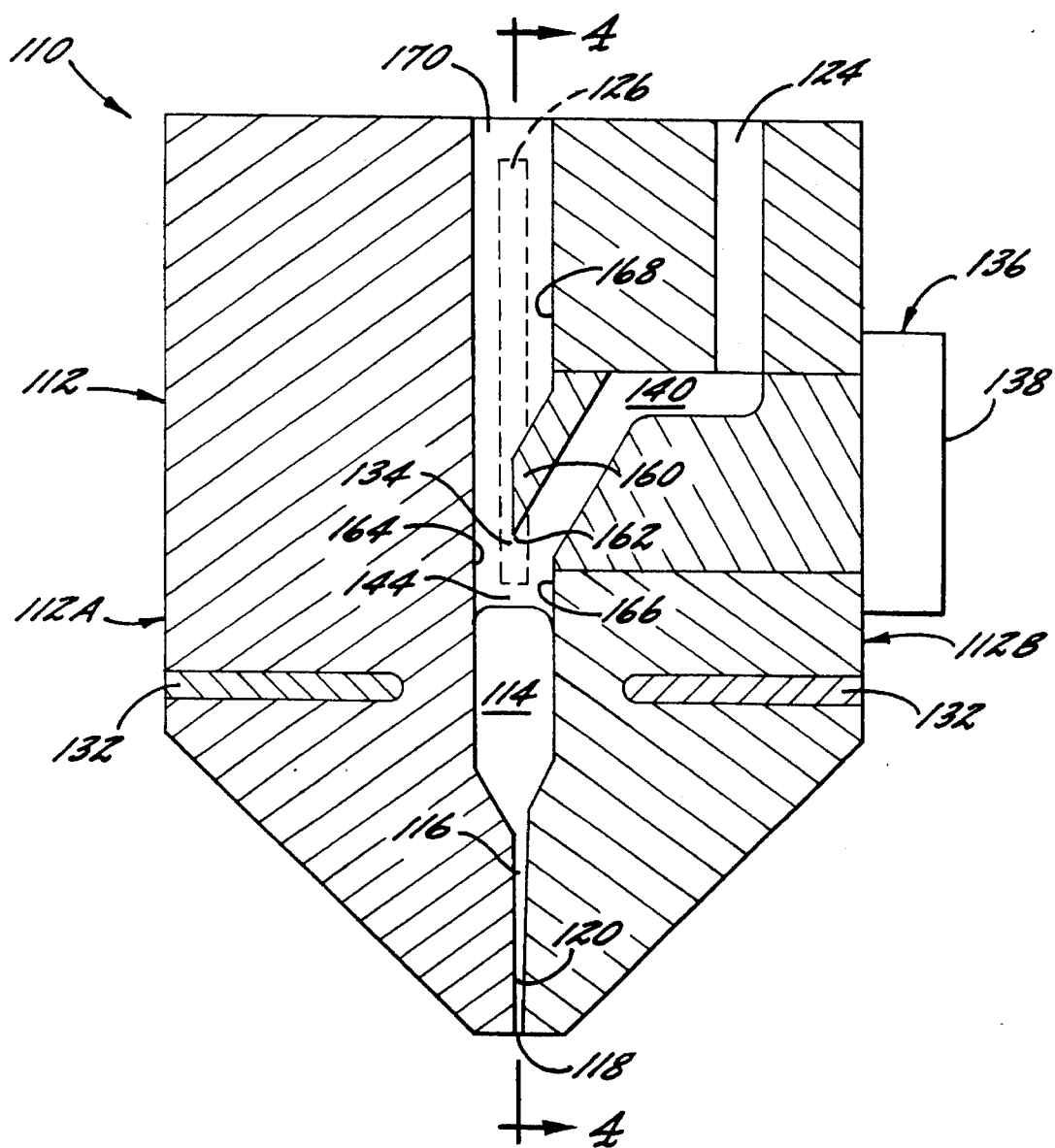
FIG. 3 is a cross-sectional view of another exemplary embodiment of an extrusion apparatus useful in carrying out the process of the present invention.
Figure 4:
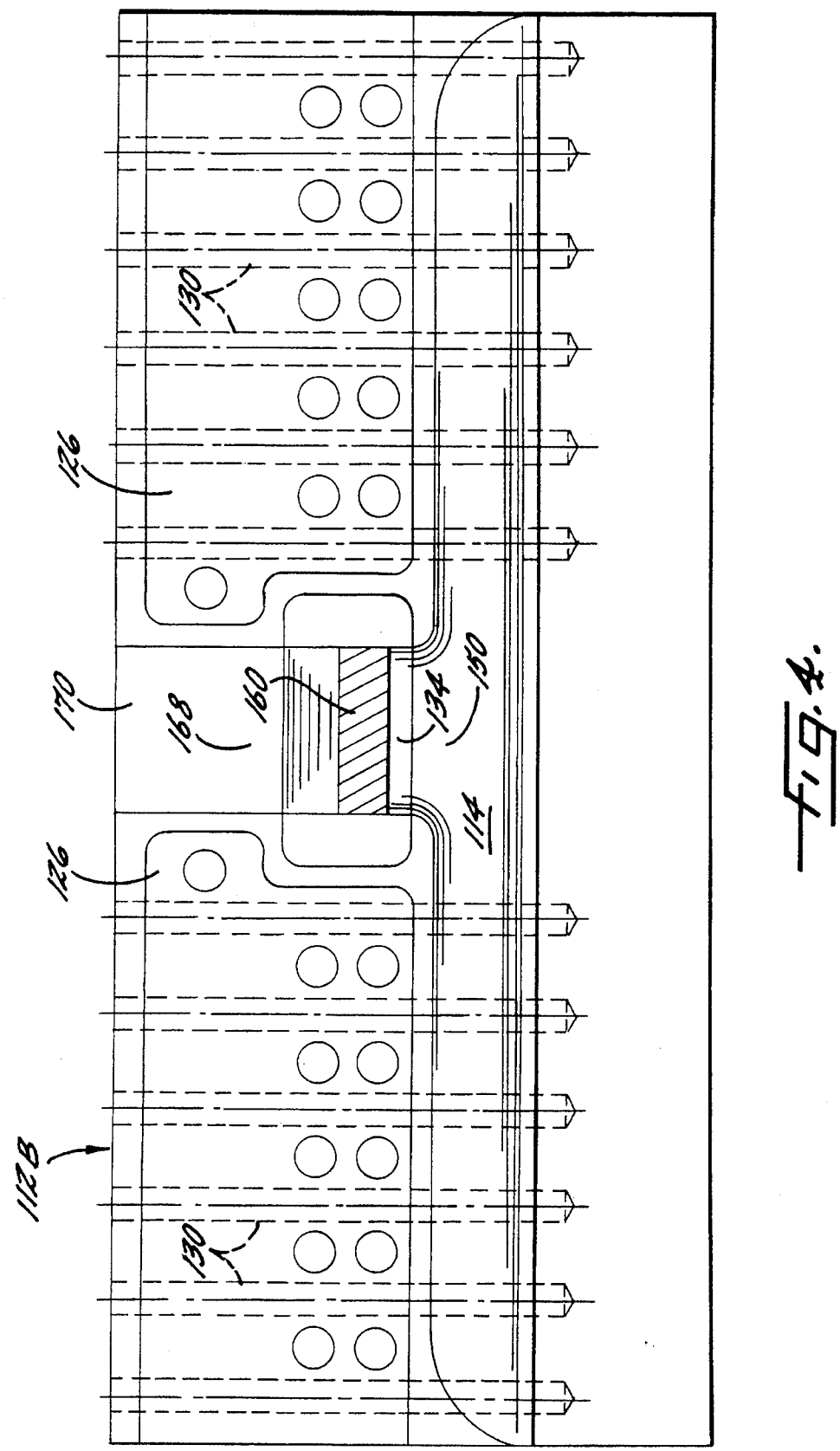
FIG. 4 is a plan view taken substantially along line 4—4 of FIG. 3, showing a die body half in full width.

Referring to FIGS. 3 and 4, another exemplary embodiment of an extrusion apparatus useful in the unique process of the present invention, is shown, which has a single combining means, and which may as in the case of apparatus 10 include thermally independent, flow delivery means for delivery of flow streams to a die body. To the extent that an apparatus 110 is similar to apparatus 10, corresponding numerals in the 100 series are used and the description is correspondingly abbreviated.

Apparatus 110 includes a die body 112 having a manifold 114, and downstream thereof a preland channel 116 in fluid communication with an exit orifice or slot 118 by a land channel 120. Upstream of the manifold and in fluid communication therewith are flow channels 170,124.

As indicated in FIG. 4, beneficially disposed at an interface of die body halves 112A,112B and in a surface recess of each die body half is a thermal barrier 126. As may be understood, each thermally independent, die body half is provided with heaters 130 and thermocouples 132 (one shown) for control of the heaters so as to provide each die half and appropriate die channel portions with a desired temperature. Thermal independence or distinctness of the die body halves, as well as of the flow channels or channel walls, may be enhanced by other temperature affecting and control means, as necessary.

Referring particularly to FIG. 3, a combining insert 136 having a flange 138, advantageously includes a channel 140 that forms channel 124 in part, and includes a wall 160 that separates channels 170,124 and provides a desired flow geometry prior to channel convergence. As indicated, insert 136 lacks a manifold; hence, the width of channel 124 may be established upstream of the insert.

Common to flow channels 170,124 is a point 162 of separating wall 160. At this point, channels 170,124 converge at a locus of convergence 134 to form a combined flow channel 144. Beneficially, a wall 166 of the combined flow channel may be provided by both the insert and die body, and may be further spaced apart from an opposing channel wall 164 than is a wall 168 of channel 170 upstream of wall 160. The combined channel feeds the composite stream provided by channel convergence, to manifold 114.

The locus of convergence of flow channels 170,124 beneficially reduces contact between the streams, as well as loss of thermal differentiation of the streams. To this end, the stream convergence is advantageously as close as possible to a locus 150, indicated in FIG. 4, within manifold 114 at which the composite stream diverges to undergo transverse flow.

Figure 5:
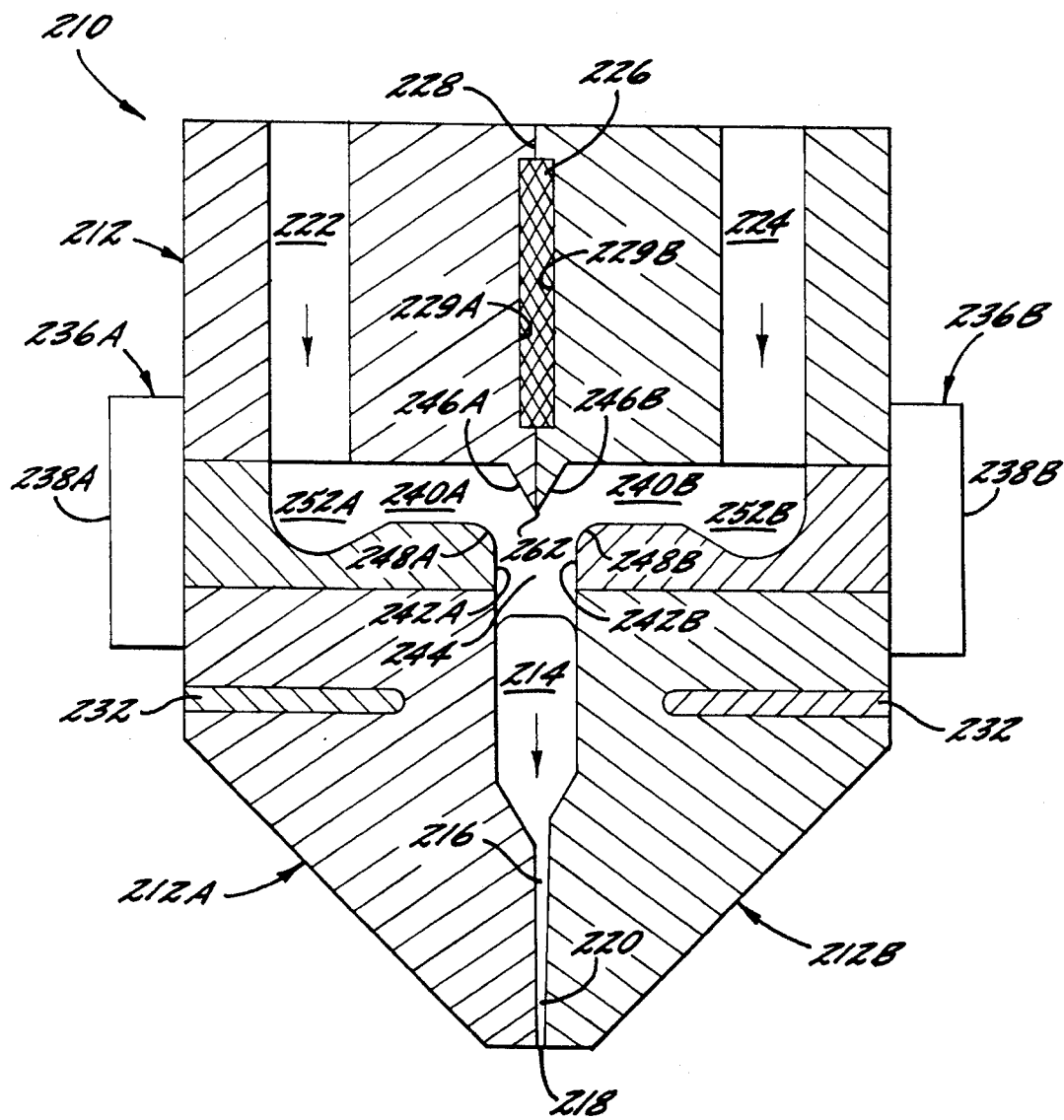
FIG. 5 is a cross-sectional view of yet another exemplary embodiment of an extrusion apparatus useful in carrying out the process of the present invention.

Referring to FIG. 5, another exemplary embodiment of an extrusion apparatus useful in the unique process of the present invention, is shown, which has a side channel in place of a centrally located channel. To the extent that apparatus 210 is similar to the prior described apparatus, corresponding numerals in the 200 series are used and the description is correspondingly abbreviated. The apparatus includes a die body 212 having a manifold 214, and downstream thereof a preland channel 216 in fluid communication with an exit orifice or slot 218 by a land channel 220.

Upstream of the manifold and in fluid communication therewith are side flow channels 222,224 between which a thermal barrier 226 is beneficially disposed at an interface 228 of die body halves 212A,212B, and more particularly in a surface recess 229 of each die body half. As may be understood, each flow channel is advantageously situated within a thermally independent, die body half provided with temperature affecting means (not shown) and a thermal detection element 232 for control of the temperature affecting means so as to provide each die half and appropriate die channel portions with a desired temperature.

Advantageously, a combining insert 236A having a flange 238A, includes a channel 240A that forms channel 222 in part, and provides a wall surface 242A of a combined flow channel 244. Guiding outflow from channel 222 into the combined flow channel is a flow-directing, wall surface 246A of die body 212A, which cooperates with a contoured surface 248A immediately upstream of wall surface 242A, to form the exit of channel 222 and for merger of the channel into the combined channel.

Conveniently, a combining insert 236B is identical to insert 236A, and die body 212B includes an identical flow-directing, wall surface 246B. Common to flow channels 222,224 is a point 262 in which flowdirecting, wall surfaces 246A,B of die bodies 212A,B join. At this point, channels 222,224 converge to form the combined flow channel. The combined channel feeds the composite stream provided by convergence, to manifold 214.

The locus of convergence of flow channels 222,224 beneficially reduces contact between the streams significantly, as well as loss of thermal differentiation of the streams. To this end, convergence of flow channels 222,224 is beneficially as close as possible to a locus (not shown) within manifold 214 at which the composite stream diverges to undergo transverse flow.

Operation of apparatus 210 will now be described for coextrusion of a melt-laminate having two polyethylene layers, in forming a composite useful for the manufacture of a liquid container. Alternative thermoplastic materials could, of course, be chosen for this and other applications.

In operation, molten polyethylene streams are issued from the respective extruders at temperatures of 330° C. and 285° C. For directly bonding to a suitable substrate, the higher melt temperature is desirable for adhesion-promoting oxidation of polyethylene. On the other hand, the other melt temperature is distinctively lower so as to reduce undesired surface oxidation and negative organoleptics.

Within extrusion apparatus 210, contact between the streams is significantly reduced by converging the streams as close as possible to the locus of divergence within the die body manifold. A flow stream-contacting temperature at or below 285° C. is maintained in die body half 212B, and a flow stream-contacting temperature at or above 310° to 330° C. is maintained in die body half 212A. After convergence and subsequent transverse flow within the manifold, a two layer, melt-laminate having thermally distinct, outer surfaces, issues from apparatus 210 for bonding of the higher melt temperature surface with the substrate, while simultaneously providing a lower temperature surface with heat seal-enhanced character, it being understood the higher the temperature, the greater the surface oxidation.

Thermal independence of the die body halves, as well as of the flow channels, is enhanced by thermal barrier 226, and may be further enhanced by other temperature affecting means. The thermal penetration thickness from the composite interface is related to the thermal character of the respective stream layers and the interface contact time. As can be understood, the process of the present invention takes advantage of heat penetration theory to coextrude layers in direct fluid communication, yet having distinctly different, surface characteristics.

Subsequent to extrusion of the composite, a container is made therefrom using conventional techniques. Accordingly, as may be understood, the polyethylene/polyethylene/ substrate will be further processed.

Figure 6:
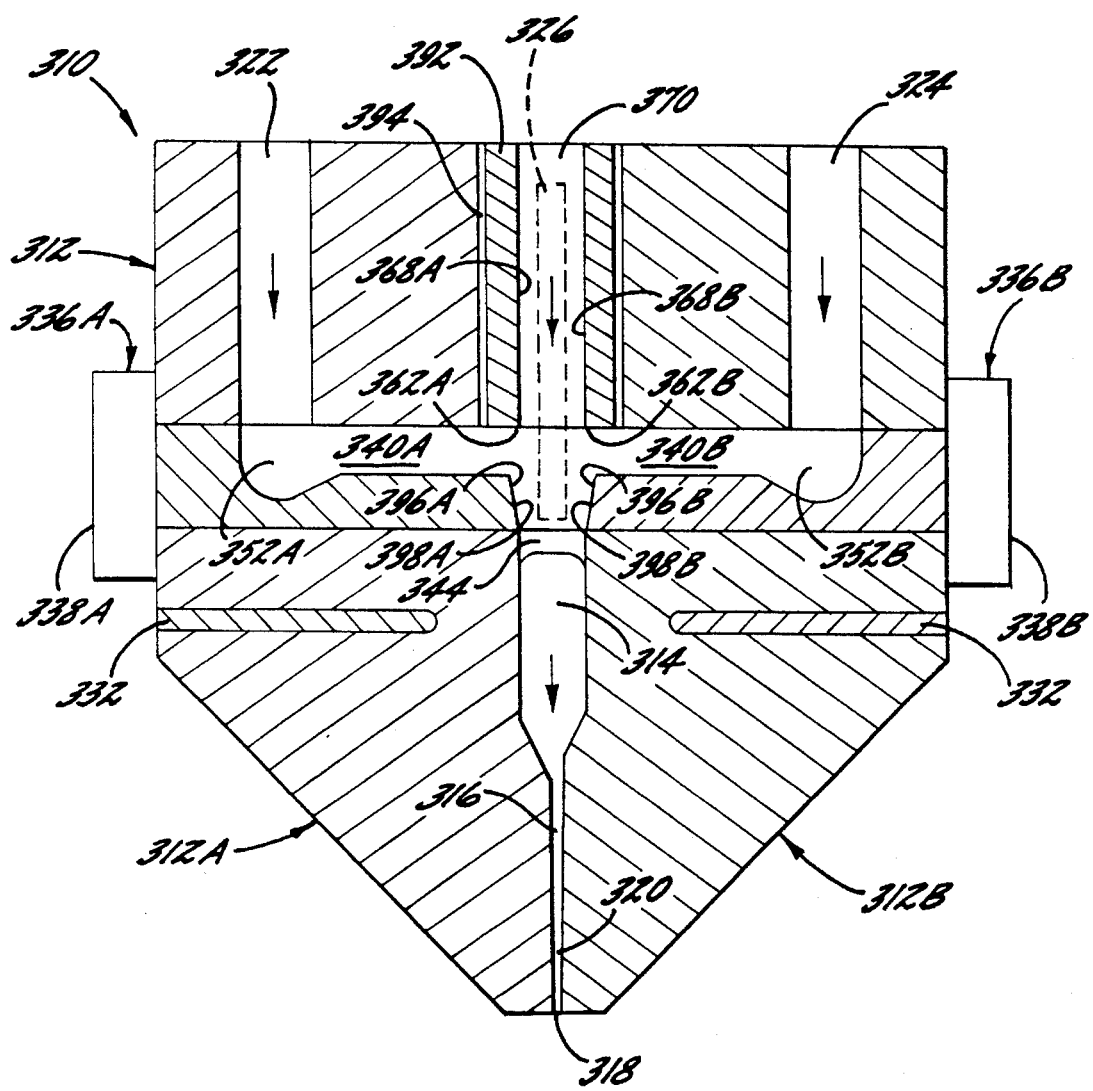
FIG. 6 is a cross-sectional view of still another exemplary embodiment of an extrusion apparatus useful in carrying out the process of the present invention.

Referring to FIG. 6, another exemplary embodiment of an extrusion apparatus useful in the unique process of the present invention, is shown, which includes a generally centrally located, upstream flow channel. To the extent that apparatus 310 is similar to the previously described apparatus, corresponding numerals in the 300 series are used and the description is correspondingly abbreviated. The apparatus includes a die body 312 having a manifold 314, and downstream thereof a preland channel 316 in fluid communication with an exit orifice or slot 318 by a land channel 320.

Upstream of the manifold and in fluid communication therewith are side flow channels 322,324, advantageously disposed in thermally independent, die body halves 312A, 312B, between which a thermal barrier 326 is beneficially located at an interface (not shown). As may be understood, each die body half is advantageously provided with temperature affecting means (not shown) and a thermal detection element 332 for control of the temperature affecting means so as to provide each die half with its desired temperature.

Also upstream of and in fluid communication with manifold 314 is a central flow channel 370. Beneficially disposed within channel 370 is a sleeve 392 spaced apart from die body 312 by a thermal barrier 394 for thermal isolation of the center flow channel from the temperature of die body 312.

Advantageously, a combining insert 336A having a flange 338A, includes a channel 340A that forms side channel 322 in part, and includes a wall surface 396A that provides a transition channel portion 398A of insert channel 340A for establishing a desired flow convergence geometry, and which in this case, increasingly reduces the thickness of the stream in central channel 370 subsequent to convergence. Common to flow channels 322,370 is a point 362A, at which these flow channels converge.

Beneficially, side channel 324 is formed in part by a channel 340B of a combining insert 336B, which is conveniently identical to insert 336A. Flow channels 324,370 converge at a point 362B. Convergence of channels 322, 370,324 forms a combined flow channel 344.

It may, of course, be understood from FIG. 6, that upstream walls 368A,368B of central channel 370, as well as points 362A,362B, are provided by sleeve 392. The combined channel feeds the composite stream provided by channel convergence, to manifold 314.

The loci of convergence of the flow channels beneficially reduce contact between the streams significantly, as well as loss of thermal differentiation. To this end, convergence of the flow channels is beneficially as close as possible to a locus within manifold 314 at which transverse flow-effecting divergence begins.

Operation of apparatus 310 will now be described for a case in which die body halves 312A,B are maintained at substantially the same temperature, which in this case is 270° C. In operation, molten polyamide streams at a temperature of 270° C. are introduced into side channels 322, 324, and a molten EVOH stream at a temperature of 230° C. is introduced into central channel 370. Loss of thermal differentiation of the EVOH stream is minimized by use of sleeve 392 and the thermal barrier 394, and by converging the streams close to the locus of divergence within manifold 314. Moreover, the EVOH stream is thereafter protected against metal contact-induced degradation by sandwiching the EVOH between the polyamide layers.

Having described the invention in detail and by reference to exemplary embodiments, it will be apparent that modifications and variations are possible without departing from the scope of the invention defined in the appended claims. Several changes or modifications have been briefly mentioned for purposes of illustration.

I claim:

1. An extrusion process comprising introducing a first stream and a second stream into an extrusion apparatus comprising a first thermally independent, flow channel and a second thermally independent, flow channel; passing said first stream through said first thermally independent flow channel, and passing said second stream through said second thermally independent, flow channel; thereafter converging said first stream and said second stream, said first stream and said second stream being thermally different, to form a composite, wherein the flow stream convergence is disposed relative to a locus at which transverse spreading begins, to limit loss of thermal differentiation; transversely spreading said composite while exposing a first face of said composite to a first thermally controlled, flow channel wall and a second face of said composite to a second thermally controlled, flow channel wall; and passing said transversely spread composite from said extrusion apparatus.

2. The process of claim 1, wherein said extrusion apparatus comprises a feedblock comprising said first thermally independent, flow channel and said second thermally independent, flow channel, and said first stream and said second stream are introduced into said feedblock.

3. The process of claim 2, wherein said first stream and said second stream are thereafter passed into a die body of said extrusion apparatus, which also comprises said first thermally independent, flow channel and said second thermally independent, flow channel.

4. The process of claim 1, wherein said first stream and said second stream are introduced into a die body of said extrusion apparatus, which comprises said first thermally independent, flow channel and said second thermally independent, flow channel.

5. The process of claim 1, wherein during said transverse spreading, said first face of said composite and said second face of said composite are exposed to thermally distinct, flow channel wall temperatures.

6. The process of claim 1, comprising coating a substrate with the extruded composite.

7. The process of claim 1, comprising passing said first stream and said second stream on opposite sides of thermal barrier means of said extrusion apparatus.

8. The process of claim 1, comprising introducing a third stream into said extrusion apparatus and converging said third stream with said first stream and said second stream prior to said transversely spreading.

9. The process of claim 1, wherein said first stream or said second stream is selected from a polyamide, a copolymer of a polyamide, a polyester, a copolymer of a polyester, and EVOH.

10. The process of claim 8, wherein said third stream is disposed by said converging, between said first stream and said second stream.

11. The process of claim 1, wherein said flow stream convergence is disposed relative to said locus at which said transverse spreading begins, to minimize loss of thermal differentiation.

12. The process of claim 1, wherein said converging comprises passing said first stream through transition channel means for increasingly reducing a dimension of said second stream.

13. The process of claim 1, comprising prior to said converging, mechanically reducing a dimension of said second stream.

14. The process of claim 1, wherein a first layer of said composite has a first surface temperature, and wherein a second layer of said composite has a thermally distinct surface temperature.

15. The process of claim 14, wherein said first layer and said second layer are in direct fluid communication.

16. The process of claim 6, wherein a first layer of said composite directly contacts said substrate and has thermally-effected, surface character for adhesion to said substrate, and wherein a second layer of said composite has a distinctly different surface character.

17. The process of claim 16, wherein said first layer and said second layer are polyethylene layers.

* * * * *